United States Patent [19]

Izumi et al.

[11] 3,758,615

[45] Sept. 11, 1973

[54] PROCESS FOR THE PREPARATION OF ALCOHOLS

[75] Inventors: Yusuke Izumi, Yamaguchi-ken; Yuzo Kawasaki, Tokuyama; Mitsuo Tani, Yamaguchi-ken, all of Japan

[73] Assignee: Tokuyama Soda Kabushiki Kaisa, Yamaguchi-ken, Japan

[22] Filed: May 5, 1970

[21] Appl. No.: 34,872

[30] Foreign Application Priority Data
May 8, 1969 Japan.............................. 44/34798

[52] U.S. Cl. ............................................... 260/641
[51] Int. Cl............................................. C07c 29/04
[58] Field of Search..................................... 260/641

[56] References Cited
UNITED STATES PATENTS
2,162,913  6/1939  Eversole et al. .................... 260/641

*Primary Examiner*—Leon Zitver
*Assistant Examiner*—Joseph E. Evans
*Attorney*—Sherman and Shalloway

[57] ABSTRACT

A process for the preparation of mono hydric alcohols from olefins which comprises contacting a monoolefin having two to four carbon atoms with an aqueous solution containing silicotungstic radicals at a concentration higher than a molar concentration of 1/40,000 but not exceeding the saturation concentration and having a pH of 2.0 to 4.5, at an elevated temperature sufficient to initiate the hydration of said olefin.

10 Claims, No Drawings

PROCESS FOR THE PREPARATION OF ALCOHOLS

This invention relates to a process for the preparation of alcohols which comprises contacting an olefin with an aqueous solution containing silicotungstic radicals at a specific concentration and hydrogen ions at a specific concentration to thereby hydrate said olefin directly to a corresponding alcohol. More specifically, the invention relates to a process for the preparation of alcohols which comprises contacting an olefin with an aqueous solution containing silicotungstic radicals at a concentration ranging from a molar concentration of 1/40,000 to the concentration not exceeding the saturation concentration and hydrogen ions at a concentration expressed in terms of pH of 2.0 to 4.5 to thereby hydrate said olefin to a corresponding alcohol.

There have been heretofore known various methods for preparing alcohols by direct hydration of olefins, and various catalysts in use for such methods have been also known. For instance, there have been known a method using a solid catalyst composed of a metal oxide such as tungsten oxide in the fixed state, a method carrying out the reaction with the use of such solid catalyst in the suspended state and a method effecting a homogeneous system reaction with the use of a catalyst of a solution of a mineral acid such as sulfuric acid.

However, any of these known methods is not practically sufficient. The method using a solid catalyst in the fixed state is defective in that when the reaction is conducted in the liquid phase, the elution of the catalyst is caused to occur and that in the case of the vapor phase reaction the conversion of the olefin is low and the catalyst is not utilized efficiently. The method using a solid catalyst in the suspended state is industrially inadvantageous because a problem of wear or abrasion of equipment is encountered and because an additional step is necessary for separating the catalyst and other impurities admixed with the resulting alcohol. Further, the method using as catalyst a mineral acid such as sulfuric acid is inconvenient and involves difficulties in its actual operation, because corrosion of equipment cannot be avoided and formation of by-products such as olefin polymer is extreme.

In Brennstoff Chemie 38 [21/22] 321 - 329 (1957) and 38 [23/24] 357 - 362 (1957) are given the results of the continuous hydration of ethylene and propylene effected in the vapor phase with a solid catalyst prepared by supporting silicotungstic acid or a difficulty soluble salt thereof on silica gel. According to the results, however, one-pass conversion of either ethylene or propylene is extremely low and the space time yield (which will be referred to simply as "STY") of the resulting alcohol is not sufficient. For instance, it is described in the above reference that when the continuous preparation of isopropanol was conducted in the vapor phase at a temperature of 160° - 220°C. under a pressure of 14.5 — 37 atmospheres with the use of a solid catalyst containing 20 percent by weight of silicotungstic acid supported on silica gel by feeding propylene at a space velocity of 2000 - 11,100 (propylene gas/liter catalyst/hr) and water at such a rate that the propylene/$H_2O$ molar ratio would be 0.9 to 2.8, isopropanol was obtained at STY of 120 - 530 g/liter catalyst/hr (178 - 786 g/Kg catalyst/hr) and a propylene conversion of 1.3 - 6.2 percent. When the above STY is converted into the value based on silicotungstic acid, it is only 0.89 –3.95 Kg/Kg silicotungstic acid/hr. On the other hand, in case the hydration of a monoolefin such as ethylene and propylene is effected in the liquid phase with the use of the above-mentioned solid catalyst composed of silicotungstic acid or a difficulty soluble salt thereof, the catalyst is eluted out during the reaction, which results in extreme lowering of the catalyst activity and operational troubles such as clogging in equipment. Accordingly, the above method is substantially difficult to work on an industrial scale. Consequently, the above proposal of conducting the hydration of olefins with the use of a solid catalyst composed of silicotungstic acid or a salt thereof cannot be an industrially sufficient process.

The primary object of this invention is to provide a process for preparing alcohols from olefins with economical advantages.

Another object of this invention is to provide a process for preparing alcohols from olefins where the operation can be easily conducted substantially without any formation of precipitates or corrosion of equipment.

Still another object of this invention is to provide a novel solution catalyst capable of converting olefins to alcohols at a high conversion and exhibiting a high catalyst efficiency.

Still another object of this invention is to provide a catalyst for the hydration of olefins which exhibits high catalyst activity and selectivity even at a very low concentration and retains a stable activity even under high temperature and high pressure conditions.

Other objects of this invention will be apparent from the description given hereinbelow.

We have made for a long time various researches on the preparation of alcohols from olefins by the direct hydration and found that in case the hydration reaction is conducted in an aqueous solution, the hydration reaction of olefins can be highly promoted by the co-existence of silicotungstic radicals ($[Si(W_3O_{10})_4]^{4-}$) and free hydrogen ions ($H^+$) and/or hydronium ions ($H_3O^+$). Based on this finding we have arrived at this invention.

Namely, in accordance with this invention there is provided a process for the preparation of monohydric alcohols from olefins which comprises contacting a monoolefin having two to four carbon atoms with an aqueous solution containing silicotungstic radicals ($[Si(W_3O_{10})_4]^{4-}$) at a concentration higher than a molar concentration of 1/40,000 but not exceeding the saturation concentration and having a pH of 2.0 to 4.5, at an elevated temperature sufficient to initiate the hydration of said olefin.

The term "concentration not exceeding the saturation concentration" referred to in the instant specification and claims means a concentration at which silicotungstic acid and/or its water-soluble salt added to the aqueous solution as source of the silicontungstic radicals does not come to precipitate in the aqueous solution.

As described above, it is essential in this invention to carry out the hydration of olefins in an aqueous solution. Further, in this invention, the activity for hydrating olefins is influenced by the concentration of the silicotungstic radical in the aqueous solution and the pH of the aqueous solution.

In case silicotungstic radical concentration in the aqueous solution to be used is extremely low, a sufficient hydration activity cannot be obtained. In order to practice the process of this invention industrially conveniently, it is generally preferred that the silicotungstic radical concentration in the aqueous solution is at least a molar concentration of 1/40,000, especially at least 1/5000, more especially at least 1/3000. Since the hydration activity increases in proportion to the concentration of the silicotungstic radical, it is theoretically sufficient that the silicotungstic radical concentration does not exceed the saturation concentration. However, at a molar concentration exceeding 1/100, a substantial increase of the hydration activity cannot be expected but such troubles as decomposition of the silicotungstic radical and corrosion of equipment are sometime caused to occur. It is therefore generally preferable to select the silicotungstic radical concentration lower than a molar concentration of 1/100. Accordingly, it is most convenient in this invention to select the concentration of the silicotungstic radical in the aqueous solution within a range of from a molar concentration of 1/3000 to a molar concentration of 1/100.

The olefin-hydrating activity of the above-mentioned catalyst-containing aqueous solution to be used in this invention is also influenced greatly by the pH of the said aqueous solution. In case the pH of the aqueous solution is greater than 6.0, the hydration activity of the catalyst solution is extremely low and such catalyst solution cannot be actually used. On the contrary, at too low a pH, the polymerization of the olefin is caused to occur, the selectivity of the resulting alcohol is lowered and a problem of corrosion of equipment is encountered, with the result that the process cannot be worked advantageously. Accordingly, it is necessary to select an optimum pH depending on the catalyst component of the aqueous solution to be used, and it is generally preferred that the pH of the aqueous solution is 2.0 – 4.5, especially 2.5 – 4.0.

In this invention, the method of preparing the catalyst-containing aqueous solution to be used for the hydration is not critical but any known method can be adopted so far as the resulting aqueous solution contains silicotungstic radicals at a concentration under reaction conditons ranging from a molar concentration of 1/40,000 to the saturation concentration, and has a pH of 2.0 – 4.5. As the method of preparing such aqueous solution there may be cited the following methods.

i. A method comprising dissolving silicotungstic acid or a water-soluble acid silicotungstate expressed by the formula $$XmHn[Si(W_3O_{10})_4]$$

wherein X is hydrogen, ammonium, methyl ammonium, ethyl ammonium, ethanol ammonium, propyl ammonium, or a water-soluble salt-forming metal, such as sodium, potassium, lithium, copper, beryllium, magnesium, calcium, barium, strontium, zinc, cadmium, aluminum, chromium, manganese, iron, cobalt and nickel, and supposed that the valence of X is $a$, $(am + n)$ is 4 ($m$ and $n$ each are a positive integer), or a mixture of them directly into water.

ii. A method comprising adjusting the pH of an aqueous solution of silicotungstic acid by adding thereto a basic compound which can heighten the pH of said aqueous solution but does not form an insoluble compound by the reaction with the silicotungstic radical, such as ammonium hydroxide and an organic amine, e.g., methylamine, ethylamine, ethanolamine, methylethylamine, propylamine and ethylenediamine, or an oxide or hydroxide of a metal recited in above (i) which can form a water-soluble acid silicotungstate or powder of such metal according to circumstances.

iii. A method comprising dissolving in water a neutral or basic water-soluble silicotungstate such as an orthosilicotungstate of a metal selected from Groups I to III of the Periodic Table and then adding to the solution an acidic compound which does not form an insoluble compound by the reaction with the silicotungstic radical, such as mineral acid, e.g., hydrochloric acid, sulfuric acid, etc. to thereby adjust the pH of the aqueous solution.

Aqueous solutions having a particularly excellent activity can be obtained when in the above method (i) silicotungstic acid, or a water-soluble acid silicotungstate of a metal of Groups I to III of the Periodic Table or a mixture thereof is used or when in the above method (ii) a compound containing a metal of Groups I to III of the Periodic Table is used as the basic compound.

When in this invention it is desired to attain a higher concentration of the silicotungstic radical while maintaining the pH of the aqueous solution at a certain level, this purpose can be easily achieved by conducting the above method (i) with the use of an acid silicotungstate of a relatively low acidity or by adopting the above method (ii). Further, in conducting any of the above methods (i) to (iii), the dissolution of added compounds may be frequently promoted conveniently by addition of an oxidizing agent such as hydrogen peroxide, heating of the aqueous solutions or by introduction of oxygen or an oxygen-containing gas into the aqueous solution by blowing.

In case an olefin having five or more carbon atoms is used in this invention, a sufficient hydration activity cannot be attained, and the one-pass conversion of the olefin and the selectivity of the intended alcohol are lowered, with the consequence that any sufficient industrial result cannot be expected. Accordingly, in this invention it is essential that the olefin to be used should be an olefin having two to four carbon atoms, namely an olefin selected from ethylene, propylene, butene-1, butene-2 and isobutylene. Specific products corresponding to these olefins are as follows:

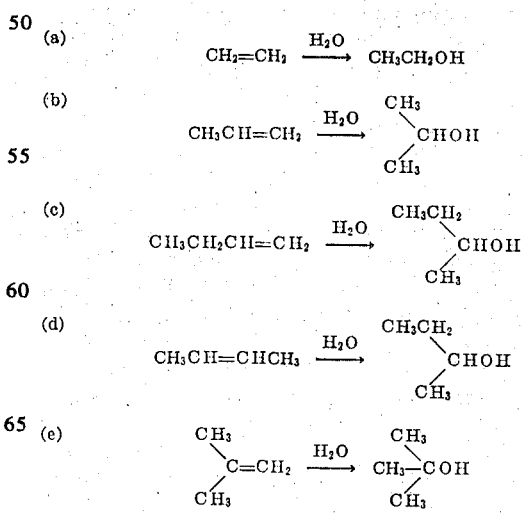

In this invention the reaction conditions for the hydration of the olefin may be varied to some extent depending on factors such as the class of the olefin, the concentration of the silicotungstic radical in the aqueous solution, the pH of the aqueous solution and the kind of the reactor. Generally speaking, it is preferably to conduct the hydration under the following conditions. Although in view of the chemical equilibrium it is an advantage to conduct the reaction at a low temperature, since the reaction rate is lowered at a lower temperature, the reaction is generally conducted at 150°–370°C., preferably at 170°–350°C. It is better to decrease the reaction temperature within the above range in proportion to the molecular weight of the olefin to be hydrated. For instance, the industrial hydration is conveniently carried out at 200°–350°C. in the case of ethylene, at 200°–300°C. in the case of propylene and at 170°–250°C. in the case of butenes. However, such reaction temperature is not critical in this invention, but the process of this invention may be conducted sufficiently at a temperature outside the above-mentioned range.

It is sufficient to conduct the reaction under a pressure not lower than the saturated vapor pressure at the reaction temperature, namely under a pressure sufficient to keep water in the liquid state at the reaction temperature. A higher pressure gives better results in the formation of the resulting alcohol. For instance, the reaction may be conveniently performed under a pressure of 100–500 Kg/cm$^2$ or a high pressure when the temperature is maintained within the above-mentioned range.

The reaction pressure may be kept at a sufficient level only by the pressure of the olefin to be hydrated, but it is also possible to introduce into the reaction system an inert gas such as helium, argon and nitrogen.

The kind of the reactor to be adopted is not critical in this invention, and any of known reactors such as a batch-wise or continuous liquid phase reactor for the direct hydration can be used without giving any modification thereto. In the case of the continuous reactor, an absorption column is usually provided, and it is generally convenient to adopt a method where the aqueous solution is efficiently contacted with the olefin in a co-current or in a counter current, the resulting alcohol is separated from the reaction liquor withdrawn from the reaction column by distillation and the remaining liquor is recycled to the reaction column.

In this invention the hydration of an olefin is performed in an aqueous solution containing silicotungstic radicals at the above-mentioned specific concentration and having the above-mentioned specific pH. Thus, the silicotungstic radicals contained in the aqueous solution exhibit an excellent catalytic activity to the hydration of olefins and the above-mentioned objects of this invention can be attained.

As is apparent from examples which will be given hereinbelow, this invention is advantageous in that the one-pass conversion of the olefin is extremely high as compared with methods using conventional solid or liquid catalysts and the selectivity of the resulting alcohol is also extremely high. Accordingly, the space time yield per unit weight of the catalyst is sufficiently high. Further, in this invention, since the reaction is performed in the homogeneous system, the operation can be conducted very easily without substantial incorporation of precipitates into the product, with the consequence that the purification of the resulting alcohol can be accomplished very easily and simply. Still further, since the pH of the aqueous solution is maintained within the above-mentioned specific range in this invention, corrosion of equipment is hardly caused to occur. Thus, the process of this invention is very advantageous also from the economical viewpoint.

This invention will now be detailed by referring to examples but this invention is not limited by these examples at all.

EXAMPLE 1

Aqueous solutions were prepared by dissolving in ion-exchange water the catalyst components indicated in Table 1 below at concentrations also indicated in Table 1. With reference to acid silicotungstate indicated in Table 1, salts of Li, Na, K and Ba were added in the form of metal hydroxides to an aqueous solution of silicotungstic acid of a prescribed concentration, the ammonium salt in the form of ammonium hydroxide, the calcium salt in the form of calcium oxide, and other salts in the form of metal powder. The pH values of resulting solutions were as shown in column "pH of aqueous solution before the reaction" of Table 1.

A 500-ml inner capacity stainless steel autoclave equipped with a stirrer was charged with 150 ml of the so prepared aqueous solution. Then the solution was heated at 150°C. and propylene was introduced therein. The introduction of propylene was stopped when the temperature and pressure reached values shown in column "Reaction conditions" of Table 1. Then, the reaction was continued for a time indicated in Table 1. Results of each run are shown in Table 1.

TABLE 1

| Run No. | Catalyst component | SW molar concentration in aqueous solution, ×10$^{-3}$ mole/l. | pH of aqueous solution Before reaction | pH of aqueous solution After reaction | Reaction conditions Temperature, °C. | Reaction conditions Pressure, Kg./cm.$^2$ | Reaction conditions Time, min. | IPA concentration, weight percent | IPA selectivity, percent |
|---|---|---|---|---|---|---|---|---|---|
| 1 | H$_4$SW | 2.50 | 2.0 | 2.6 | 270 | 200 | 30 | 15.0 | 90 |
| 2 | H$_4$SW | 1.67 | 2.2 | 2.8 | 270 | 200 | 30 | 14.0 | 90 |
| 3 | H$_4$SW | 0.237 | 3.1 | 3.3 | 230 | 200 | 60 | 7.2 | 99 |
| 4 | H$_4$SW | 0.144 | 3.3 | 3.6 | 270 | 200 | 30 | 12.2 | 97 |
| 5 | H$_4$SW | 0.025 | 4.0 | 4.1 | 230 | 200 | 60 | 2.7 | 99 |
| 6 | Na$_3$HSW | 1.00 | 3.0 | 3.1 | 150 | 200 | 120 | 1.5 | 99 |
| 7 | Na$_3$HSW | 1.00 | 3.0 | 3.2 | 230 | 100 | 60 | 5.4 | 99 |
| 8 | Na$_3$HSW | 1.00 | 3.0 | 3.2 | 230 | 200 | 60 | 8.5 | 99 |
| 9 | Na$_3$HSW | 1.00 | 3.0 | 3.2 | 230 | 250 | 60 | 10.7 | 90 |
| 10 | Na$_3$HSW | 1.00 | 3.0 | 3.8 | 350 | 200 | 30 | 8.6 | 99 |
| 11 | Na$_{3.5}$H$_{0.5}$SW | 1.00 | 3.3 | 3.4 | 230 | 200 | 60 | 5.7 | 99 |
| 12 | Na$_{3.5}$H$_{0.5}$SW | 1.00 | 3.3 | 3.4 | 270 | 200 | 30 | 15.3 | 98 |
| 13 | Na$_{3.7}$H$_{0.3}$SW | 1.00 | 3.5 | 3.7 | 230 | 200 | 60 | 4.9 | 99 |
| 14 | Na$_{3.9}$H$_{0.1}$SW | 1.00 | 4.0 | 4.1 | 230 | 200 | 60 | 3.4 | 99 |
| 15 | Na$_{3.85}$H$_{0.15}$SW | 6.90 | 3.0 | 3.3 | 270 | 200 | 30 | 15.3 | 98 |

TABLE 1—Continued

| Run No. | Catalyst component | SW molar concentration in aqueous solution, ×10⁻³ mole/l. | pH of aqueous solution Before reaction | pH of aqueous solution After reaction | Temperature, °C. | Pressure, Kg./cm.² | Time, min. | IPA concentration, weight percent | IPA selectivity, percent |
|---|---|---|---|---|---|---|---|---|---|
| 16 | Na₃.₇₆H₀.₂₄SW | 3.33 | 3.1 | 3.2 | 230 | 200 | 60 | 7.9 | 99 |
| 17 | Na₃.₄H₀.₆SW | 1.67 | 3.0 | 3.3 | 270 | 200 | 30 | 15.5 | 98 |
| 18 | K₃HSW | 1.00 | 3.0 | 3.3 | 230 | 200 | 60 | 9.7 | 99 |
| 19 | Li₃HSW | 1.00 | 3.0 | 3.2 | 230 | 200 | 60 | 10.8 | 99 |
| 20 | Mg₁.₅HSW | 1.00 | 3.0 | 3.5 | 230 | 200 | 60 | 7.0 | 99 |
| 21 | Ca₁.₅HSW | 1.00 | 3.0 | 3.4 | 230 | 200 | 60 | 7.6 | 99 |
| 22 | Ba₁.₅HSW | 1.00 | 3.0 | 3.1 | 230 | 200 | 60 | 12.9 | 99 |
| 23 | Cu₁.₅HSW | 1.00 | 3.1 | 3.9 | 230 | 200 | 60 | 17.0 | 98 |
| 24 | Zn₁.₅HSW | 1.00 | 3.0 | 2.8 | 230 | 200 | 60 | 17.8 | 98 |
| 25 | AlHSW | 1.00 | 3.0 | 2.7 | 230 | 200 | 60 | 19.8 | 98 |
| 26 | FeHSW | 1.00 | 3.0 | 3.2 | 230 | 200 | 60 | 8.0 | 99 |
| 27 | Ni₁.₅HSW | 1.00 | 3.0 | 3.2 | 230 | 200 | 60 | 10.1 | 99 |
| 28 | CrHSW | 1.00 | 3.0 | 3.0 | 230 | 200 | 60 | 13.6 | 98 |
| 29 | (NH₄)₃HSW | 1.00 | 3.1 | 3.3 | 230 | 200 | 60 | 8.3 | 99 |
| 30 | (CH₃NH₃)₃HSW | 1.00 | 3.1 | 3.3 | 230 | 200 | 60 | 8.0 | 99 |

NOTE: In the table, "SW" is an abbreviation of $[Si(W_3O_{10})_4]$ and "IPA" is that of isopropanol.

EXAMPLE 2

1. Copper sulfate (CuSO₄·5H₂O) (100 mg) was dissolved in 250 ml of an aqueous solution containing free silicotungstic acid at a molar concentration of $1.00 \times 10^{-3}$ mole/l, and the pH of the solution was adjusted to 3.0 by addition of a 0.1 N aqueous solution of NaOH.

2. Zinc chloride (50 mg) was dissolved in 250 ml of an aqueous solution containing free silicotungstic acid at a molar concentration of $1.00 \times 10^{-3}$ mole/l and the pH of the solution was adjusted to 3.0 by addition of a 0.1 N aqueous solution of NaOH.

The same autoclave as used in Example 1 was charged with 150 ml of either of the above aqueous solutions (1) and (2) and propylene was introduced therein in the same manner as in Example 1. The reaction was effected at 230°C. under 200 Kg/cm² for 60 minutes. In the case of the aqueous solution (1), the concentration of the resulting isopropanol was 16.4 percent by weight and the selectivity thereof was 98 percent. In the case of the aqueous solution (2), the concentration of the resulting isopropanol was 13.7 percent by weight and the selectivity thereof was 98 percent. In the above runs, since pH values of the aqueous solutions (1) and (2) were adjusted by addition of a 0.1 N aqueous solution of NaOH, it is construed that the silicotungstic radical was in the form of a double salt of the composition $Cu_{1.5}H[Si(W_3O_{10})_4]\cdot 3/2Na_2SO_4$ in the solution (1) or $Zn_{1.5}H[Si(W_3O_{10})_4]\cdot 3NaCl$ in the solution (2).

EXAMPLE 3

Aqueous solutions having a pH indicated in Table 2 below were prepared by dissolving in ion-exchange water a catalyst component indicated in Table 2 so as to adjust the molar concentration of free silicotungstic radicals ($[Si(W_3O_{10})_4]^{4-}$) to a value indicated in Table 2. The same reactor as used in Example 1 was charged with 150 ml of the so formed aqueous solution and an olefin indicated in Table 2 was introduced therein in the same manner as in Example 1. The hydration of the olefin was carried out under the conditions shown in Table 2. Results are shown in Table 2. In Runs Nos. 5 – 8, the starting butene was a mixture of 40 percent butene-1 and 40 percent isobutylene, the balance being substantially butane and the main product was a mixture of secondary and tertiary butanols at a ratio of almost 1:1.

TABLE 2

| | Aqueous solution used | | | | Reaction conditions | | | Results | |
|---|---|---|---|---|---|---|---|---|---|
| Kind of olefin | Catalyst component | SW molar concentration, ×10⁻³ mole/l. | pH value | Temperature, °C. | Pressure, Kg/cm.² | Time, min. | Main product | Main product concentration, percent by weight | Selectivity of main product, percent |
| Run Nos. | | | | | | | | | |
| 1 Ethylene | H₄SW | 0.237 | 3.1 | 300 | 300 | 240 | Ethanol | 8.6 | 91 |
| 2 do | Na₃HSW | 1.00 | 3.0 | 300 | 300 | 240 | do | 9.7 | 90 |
| 3 do | Cu₁.₅HSW | 1.00 | 3.1 | 300 | 300 | 240 | do | 11.3 | 90 |
| 4 do | AlHSW | 1.00 | 3.0 | 300 | 300 | 240 | do | 12.5 | 90 |
| 5 Butene | H₄SW | 0.237 | 3.1 | 200 | 200 | 240 | Butanol | 8.5 | 95 |
| 6 do | Na₃HSW | 1.00 | 3.0 | 200 | 200 | 240 | do | 9.3 | 95 |
| 7 do | Cu₁.₅ | 1.00 | 3.1 | 200 | 200 | 240 | do | 10.0 | 95 |
| 8 do | AlHSW | 1.00 | 3.0 | 200 | 200 | 240 | do | 10.1 | 95 |

NOTE: In the Table "SW" is an abbreviation of $[Si(W_3O_{10})_4]$.

EXAMPLE 4

An acid silicotungstate indicated in Table 3 below was dissolved in ion-exchange water and the concentration of silicotungstic radicals ($[Si(W_3O_{10})_4]^{4-}$) was adjusted to $1.00 \times 10^{-3}$ mole/l. The continuous hydration of an olefin indicated in Table 3 was conducted with the use of the so formed aqueous solution. The pH of the aqueous solution was 3.0 except Run No. 3 where $Cu_{1.5}H[Si(W_3O_{10})_4]$ was used and the pH was 3.1. The aqueous solution was fed at a rate indicated in Table 3 to a tubular reactor from its top and the olefin was introduced at a rate indicated in Table 3 into the reactor from its bottom. Thus, the continuous hydration was effected under conditions indicated in Table 3. The reaction product was withdrawn from the bottom of the reactor in the form of a mixture of the resulting alcohol and the aqueous solution, and the alcohol was separated therefrom. The alcohol was obtained with the results shown in Table 3, each value being an average for 24 hours after initiation of the reaction. In Table 3 the value of the "conversion of olefin" is that of the one-pass conversion.

TABLE 3

| Run No. | 1 | 2 | 3 | 4 | 5 |
|---|---|---|---|---|---|
| Kind of olefin | (1) | (1) | (1) | (2) | (3) |
| Aqueous solution [4]: | | | | | |
| Catalyst component | Na$_3$HSW | Cu$_{1.5}$HSW | AlHSW | Na$_3$HSW | Na$_3$HSW |
| SW molar concentration, ×10$^{-3}$ mole/l | 1.00 | 1.00 | 1.00 | 100. | 1.00 |
| pH | 3.0 | 3.1 | 3.0 | 3.0 | 3.0 |
| Feeding rates of olefin and aqueous solution [5]: | | | | | |
| Olefin, Kg./l·R/hr | 0.26 | 0.26 | 0.26 | 0.24 | 0.56 |
| Aqueous solution, Kg./l·R/hr | 3.0 | 3.0 | 3.0 | 3.0 | 3.0 |
| Reaction conditions: | | | | | |
| Temperature, °C | 280 | 280 | 280 | 300 | 220 |
| Pressure, Kg./cm.$^2$ | 250 | 250 | 250 | 300 | 200 |
| Results: Conversion of olefin, percent | 71 | 73 | 69 | 44 | 61 |
| Main product: | | | | | |
| Kind | (6) | (6) | (6) | (7) | (8) |
| Concentration, wt. percent | 8.7 | 10.0 | 9.4 | 5.5 | 11.4 |
| Selectivity percent | 99 | 99 | 99 | 95 | 95 |
| STY [9], Kg./Kg.Cat./hr | 29.0 | 33.3 | 31.3 | 18.3 | 38.0 |

[1] Propylene.
[2] Ethylene.
[3] The starting butene was a mixture of 40 percent isobutylene and 40 percent butene-1, the balance being substantially butane, and the main product was a mixture of secondary and tertiary butanol at a mixing ratio of about 1:1.
[4] SW is abbreviation of [Si(W$_3$O$_{10}$)$_4$]
[5] The feed rate of each of the olefin and aqueous solution was expressed in terms of the weight feed for one hour per liter of the reactor.
[6] Isopropanol.
[7] Ethanol.
[8] Butanol.
[9] STY is an abbreviation of the space time yield and shows the weight (Kg) of the product obtained by one hour's reaction per Kg of the catalyst on the dry base.

What we claim is:

1. A process for the preparation of monohydric alcohols from alkenes which comprises contacting an alkene having two to four carbon atoms with an aqueous solution containing silicotungstic radicals derived from silicotungstic acid, ammonium, methyl ammonium, ethyl ammonium, ethanol ammonium, propyl ammonium, and water-soluble metal salts of silicotungstic acid or mixtures thereof, at a molar concentration of 1/5,000 to 1/100 and having a pH of 2.5 to 4.0, at an elevated temperature sufficient to initiate the hydration of said alkene.

2. The process of claim 1 wherein said contact of the alkene with the aqueous solution containing silicotungstic radicals is effected at a reaction temperature of 150° to 370°C. and under a pressure not lower than the saturated vapor pressure at said reaction temperature.

3. The process of claim 1 wherein the contact of said olefin with the aqueous solution containing silicotungstic radicals is effected at a temperature of 170°C to 350°C. and under a pressure of 100 to 500 Kg/cm$^2$.

4. The process as of claim 1 wherein the aqueous solution containing silicotungstic radicals is an aqueous solution of silicotungstic acid.

5. The process of claim 1 wherein the aqueous solution containing silicotungstic radicals is an aqueous solution of a water-soluble acid silicotungstate.

6. The process of claim 5 wherein the aqueous solution of a water-soluble acid silicotungstate is an aqueous solution of an acid silicotungstate of at least one metal selected from the group consisting of sodium, potassium, lithium, magnesium, calcium, barium, zinc and aluminum.

7. The process of claim 1 wherein said alkene is ethylene and ethanol is prepared as the product.

8. The process of claim 1 wherein said alkene is propylene and isopropanol is prepared as the product.

9. The process of claim 1 wherein said alkene is butene and butanol is prepared as the product.

10. The process of claim 8 wherein propylene is contacted at a reaction temperature of 200° to 300°C. and under a pressure not lower than the saturated vapor pressure at said reaction temperature, with an aqueous solution containing silicotungstic radicals at a molar concentration of 1/3000 to 1/100.

* * * * *

UNITED STATES PATENT OFFICE
CERTIFICATE OF CORRECTION

Patent No. 3,758,615      Dated September 11, 1973

Inventor(s) Yusuke IZUMI, Yuzo KAWASAKI and Mitsuo TANI

It is certified that error appears in the above-identified patent and that said Letters Patent are hereby corrected as shown below:

Column 9, Claim 3, line 2: delete "olefin" and substitute --alkene--

Column 10, Claim 9, line 2: delete "is" in the first instance.

Signed and sealed this 25th day of December 1973.

(SEAL)
Attest:

EDWARD M. FLETCHER, JR.　　　　　RENE D. TEGTMEYER
Attesting Officer　　　　　　　　Acting Commissioner of Patents